(12) United States Patent
Åhgren et al.

(10) Patent No.: US 9,042,573 B2
(45) Date of Patent: May 26, 2015

(54) PROCESSING SIGNALS

(75) Inventors: Per Åhgren, Stockholm (SE); Karsten Vandborg Sorensen, Stockholm (SE)

(73) Assignee: Skype, Dublin (IE)

( * ) Notice: Subject to any disclaimer, the term of this patent is extended or adjusted under 35 U.S.C. 154(b) by 557 days.

(21) Appl. No.: 13/308,165

(22) Filed: Nov. 30, 2011

(65) Prior Publication Data

US 2013/0083942 A1    Apr. 4, 2013

(30) Foreign Application Priority Data

Sep. 30, 2011    (GB) ................................. 1116840.8

(51) Int. Cl.
H04R 3/00      (2006.01)
G01S 3/80      (2006.01)
G01S 3/808     (2006.01)
G10L 21/0216   (2013.01)

(52) U.S. Cl.
CPC ............. G01S 3/8006 (2013.01); G01S 3/8083 (2013.01); H04R 3/005 (2013.01); *G10L 2021/02166* (2013.01); *H04R 2499/11* (2013.01)

(58) Field of Classification Search
USPC .............. 381/92, 93, 95, 96, 94.1, 94.3, 94.5; 700/94
See application file for complete search history.

(56) References Cited

U.S. PATENT DOCUMENTS

| | | |
|---|---|---|
| 4,849,764 A | 7/1989 | van Heyningen |
| 5,208,864 A | 5/1993 | Kaneda |
| 5,524,059 A | 6/1996 | Zurcher |
| 6,157,403 A | 12/2000 | Nagata |
| 6,232,918 B1 | 5/2001 | Wax et al. |
| 6,339,758 B1 | 1/2002 | Kanazawa et al. |
| 6,914,854 B1 | 7/2005 | Heberley et al. |
| 8,249,862 B1 * | 8/2012 | Cheng et al. ................... 704/205 |

(Continued)

FOREIGN PATENT DOCUMENTS

| | | |
|---|---|---|
| CA | 2413217 | 5/2004 |
| CN | 100446530 | 3/2001 |

(Continued)

OTHER PUBLICATIONS

"Foreign Office Action", CN Application No. 201210377130.8, Jan. 15, 2014, 12 pages.

(Continued)

*Primary Examiner* — Vivian Chin
*Assistant Examiner* — Friedrich W Fahnert
(74) *Attorney, Agent, or Firm* — Sonia Cooper; Jim Ross; Micky Minhas

(57) ABSTRACT

Beamformer coefficients may include a plurality of sets of theoretical statistical data for theoretical signals. Each theoretical signal may have its own particular attributes. The statistical data may be used in computing beamformer coefficients for application by a beamformer to signals received at a device. Signals are received at an input of the device. A respective plurality of weights is determined, for the theoretical statistical data sets, based on an analysis of the extent to which the signals have the particular attributes of the theoretical signals. The theoretical are retrieved, and a statistical data set is calculated for the signals by performing a weighted sum of the theoretical statistical data sets using the determined respective plurality of weights. Beamformer coefficients are computed based on the calculated statistical data set for the signals, which are used by a beamformer to the signals for generating a beamformer output.

28 Claims, 5 Drawing Sheets

(56) References Cited

U.S. PATENT DOCUMENTS

| | | | |
|---|---|---|---|
| 8,325,952 | B2 | 12/2012 | Cho |
| 8,401,178 | B2 | 3/2013 | Chen et al. |
| 8,620,388 | B2 | 12/2013 | Hayakawa et al. |
| 8,824,693 | B2 | 9/2014 | Ahgren |
| 8,891,785 | B2 | 11/2014 | Sorensen |
| 8,981,994 | B2 | 3/2015 | Sorenson |
| 2002/0015500 | A1 | 2/2002 | Belt et al. |
| 2002/0103619 | A1 | 8/2002 | Bizjak |
| 2002/0171580 | A1 | 11/2002 | Gaus et al. |
| 2004/0125942 | A1 | 7/2004 | Beaucoup et al. |
| 2004/0213419 | A1 | 10/2004 | Varma et al. |
| 2005/0149339 | A1 | 7/2005 | Tanaka et al. |
| 2005/0216258 | A1 | 9/2005 | Kobayashi et al. |
| 2005/0232441 | A1 | 10/2005 | Beaucoup et al. |
| 2006/0015331 | A1 | 1/2006 | Hui et al. |
| 2006/0031067 | A1 | 2/2006 | Kaminuma |
| 2006/0133622 | A1 | 6/2006 | Chen |
| 2006/0153360 | A1 | 7/2006 | Kellermann |
| 2006/0269073 | A1 | 11/2006 | Mao |
| 2007/0164902 | A1 | 7/2007 | Bang et al. |
| 2008/0039146 | A1 | 2/2008 | Jin |
| 2008/0199025 | A1 | 8/2008 | Amada |
| 2008/0232607 | A1 | 9/2008 | Tashev et al. |
| 2008/0260175 | A1 | 10/2008 | Elko |
| 2009/0010453 | A1 | 1/2009 | Zurek et al. |
| 2009/0076810 | A1 | 3/2009 | Matsuo |
| 2009/0076815 | A1 | 3/2009 | Ichikawa et al. |
| 2009/0125305 | A1 | 5/2009 | Cho |
| 2009/0274318 | A1 | 11/2009 | Ishibashi et al. |
| 2009/0304211 | A1 | 12/2009 | Tashev et al. |
| 2010/0014690 | A1 | 1/2010 | Wolff et al. |
| 2010/0027810 | A1 | 2/2010 | Marton |
| 2010/0070274 | A1 | 3/2010 | Cho et al. |
| 2010/0081487 | A1* | 4/2010 | Chen et al. ................. 455/575.1 |
| 2010/0103776 | A1 | 4/2010 | Chan |
| 2010/0128892 | A1 | 5/2010 | Chen et al. |
| 2010/0150364 | A1 | 6/2010 | Buck et al. |
| 2010/0177908 | A1 | 7/2010 | Seltzer et al. |
| 2010/0215184 | A1 | 8/2010 | Buck et al. |
| 2010/0217590 | A1 | 8/2010 | Nemer et al. |
| 2010/0246844 | A1 | 9/2010 | Wolff et al. |
| 2010/0296665 | A1 | 11/2010 | Ishikawa et al. |
| 2010/0315905 | A1 | 12/2010 | Lee et al. |
| 2010/0323652 | A1 | 12/2010 | Visser et al. |
| 2011/0038486 | A1 | 2/2011 | Beaucoup |
| 2011/0038489 | A1 | 2/2011 | Visser et al. |
| 2011/0054891 | A1 | 3/2011 | Vitte et al. |
| 2011/0070926 | A1 | 3/2011 | Vitte et al. |
| 2011/0158418 | A1 | 6/2011 | Bai et al. |
| 2011/0178798 | A1 | 7/2011 | Flaks et al. |
| 2012/0182429 | A1 | 7/2012 | Forutanpour et al. |
| 2012/0303363 | A1 | 11/2012 | Sorensen |
| 2013/0013303 | A1 | 1/2013 | Strommer |
| 2013/0034241 | A1 | 2/2013 | Pandey et al. |
| 2013/0082875 | A1 | 4/2013 | Sorensen |
| 2013/0083832 | A1 | 4/2013 | Sorensen |
| 2013/0083934 | A1 | 4/2013 | Åhgren |
| 2013/0083936 | A1 | 4/2013 | Sorensen |
| 2013/0083943 | A1 | 4/2013 | Sorensen |
| 2013/0129100 | A1 | 5/2013 | Sorensen |
| 2013/0136274 | A1 | 5/2013 | Åhgren |
| 2013/0148821 | A1 | 6/2013 | Sorensen |

FOREIGN PATENT DOCUMENTS

| | | |
|---|---|---|
| CN | 1406066 | 3/2003 |
| CN | 1698395 | 11/2005 |
| CN | 1809105 | 7/2006 |
| CN | 1815918 | 8/2006 |
| CN | 1835416 | 9/2006 |
| CN | 1885848 | 12/2006 |
| CN | 101015001 | 8/2007 |
| CN | 101018245 | 8/2007 |
| CN | 101207663 | 6/2008 |
| CN | 100407594 | 7/2008 |
| CN | 101278596 | 10/2008 |
| CN | 101455093 | 6/2009 |
| CN | 101625871 | 1/2010 |
| CN | 101667426 | 3/2010 |
| CN | 101685638 | 3/2010 |
| CN | 101828410 | 9/2010 |
| CN | 102111697 | 6/2011 |
| CN | 102131136 | 7/2011 |
| CN | 1540903 | 10/2014 |
| DE | 19943872 | 3/2001 |
| EP | 0002222 | 6/1979 |
| EP | 0654915 | 5/1995 |
| EP | 1722545 | 11/2006 |
| EP | 1919251 | 5/2008 |
| EP | 1930880 | 6/2008 |
| EP | 2026329 | 2/2009 |
| EP | 2159791 | 3/2010 |
| EP | 2175446 | 4/2010 |
| EP | 2197219 | 6/2010 |
| EP | 2222091 | 8/2010 |
| EP | 2339574 | 6/2011 |
| JP | 2006109340 | 4/2006 |
| JP | 2006319448 | 11/2006 |
| JP | 2006333069 | 12/2006 |
| JP | 2010232717 | 10/2010 |
| TW | 201123175 | 7/2011 |
| WO | WO-0018099 | 3/2000 |
| WO | WO-03010996 | 2/2003 |
| WO | WO-2007127182 | 11/2007 |
| WO | WO-2008041878 | 4/2008 |
| WO | WO-2008062854 | 5/2008 |
| WO | WO-2010098546 | 9/2010 |
| WO | WO-2012097314 | 7/2012 |

OTHER PUBLICATIONS

"International Search Report and Written Opinion", Application No. PCT/EP2012/059937, Feb. 14, 2014, 9 pages.

"Non-Final Office Action", U.S. Appl. No. 13/327,308, Mar. 28, 2014, 13 pages.

"Notice of Allowance", U.S. Appl. No. 13/307,994, Apr. 1, 2014, 7 pages.

"International Search Report", Mailed Date: Apr. 24, 2013, Application No. PCT/US2012/058145, Filed Date: Sep. 29, 2012, pp. 18.

GRBIC, et al., "Soft Constrained subband beamforming for hands-free speech enhancement", Retrieved at <<http://www.bth.se/fou/forskinfo.nsf/0/478e2ff84c311a15c1256b56000d7073/$file/icassp02.pdf>>, IEEE International Conference on Acoustics, Speech and Signal Processing. Proceedings. (ICASSP, vol. 01, May 13, 2002, pp. 4.

"PCT Search Report and Written Opinion", Application No. PCT/US2012/068649, (Mar. 7, 2013), 9 pages.

"PCT Search Report and Written Opinion", Application No. PCT/US2012/058148, (May 3, 2013), 9 pages.

"PCT Search Report and Written Opinion", Application No. PCT/US2012/058147, (May 8, 2013), 9 pages.

"PCT Search Report and Written Opinion", Application No. PCT/US2012/058143, (Dec. 21, 2012),12 pages.

Goldberg, et al., "Joint Direction-of-Arrival and Array Shape Tracking for Multiple Moving Targets", *IEEE International Conference on Acoustics, Speech, and Signal Processing*, (Apr. 21, 1997), pp. 511-514.

Handzel, et al., "Biomimetic Sound-Source Localization", IEEE Sensors Journal, vol. 2, No. 6, (Dec. 2002), pp. 607-616.

Kellerman, W. "Strategies for Combining Acoustic Echo Cancellation and Adaptive Beamforming Microphone Arrays", *In Proceedings of ICASSP 1997*, (Apr. 1997), pp. 219-222.

"Search Report", Application No. GB1116846.5, Jan. 28, 2013, 3 pages.

"Search Report", GB Application No. 1116840.8, Jan. 29, 2013, 3 pages.

"Search Report", GB Application No. 1116843.2, Jan. 30, 2013, 3 pages.

"Search Report", GB Application No. 1116869.7, Feb. 7, 2013, 3 pages.

(56) References Cited

OTHER PUBLICATIONS

"Search Report", GB Application No. 1121147.1, Feb. 14, 2013, 5 pages.
"UK Search Report", UK Application No. GB1116848.1, Dec. 18, 2012, 3 pages.
"International Search Report and Written Opinion", Application No. PCT/US2013/058144, (Sep. 11, 2013),10 pages.
"Non-Final Office Action", U.S. Appl. No. 13/212,633, (Nov. 1, 2013),14 pages.
"Non-Final Office Action", U.S. Appl. No. 13/212,688, (Nov. 7, 2013),14 pages.
Knapp, et al., "The Generalized Correlation Method for Estimation of Time Delay", *IEEE Transactions on Acoustics, Speech, and Signal Processing*, vol. ASSP-24, No. 4, (Aug. 1976), pp. 320-327.
"PCT Search Report and Written Opinion", Application No. PCT/US2012/2065737, (Feb. 13, 2013),12 pages.
"PCT Search Report and Written Opinion", Application No. PCT/US/2012/045556, (Jan. 2, 2013),10 pages.
"PCT Search Report and Written Opinion", Application No. PCT/US2012/058146, (Jan. 21, 2013), 9 pages.
"PCT Search Report and Written Opinion", Application No. PCT/US2012/066485, (Feb. 15, 2013),12 pages.
"Non-Final Office Action", U.S. Appl. No. 13/341,610, Dec. 27, 2013, 10 pages.
"Non-Final Office Action", U.S. Appl. No. 13/307,994, Dec. 19, 2013, 12 pages.
"Non-Final Office Action", U.S. Appl. No. 13/307,852, Feb. 20, 2014, 5 pages.
"Search Report", GB Application No. 1119932.0, Feb. 28, 2013, 8 pages.
"Foreign Office Action", CN Application No. 201210368101.5, Dec. 6, 2013, 9 pages.
"Search Report", GB Application No. 1108885.3, (Sep. 3, 2012), 3 pages.
"Search Report", GB Application No. 1111474.1, (Oct. 24, 2012), 3 pages.
"Search Report", GB Application No. 1116847.3, (Dec. 20, 2012), 3 pages.
"Corrected Notice of Allowance", U.S. Appl. No. 13/307,994, Jun. 24, 2014, 2 pages.
"Final Office Action", U.S. Appl. No. 13/212,633, May 23, 2014, 16 pages.
"Final Office Action", U.S. Appl. No. 13/212,688, Jun. 5, 2014, 20 pages.
"Final Office Action", U.S. Appl. No. 13/341,610, Jul. 17, 2014, 7 pages.
"Foreign Office Action", CN Application No. 201210367888.3, Jul. 15, 2014, 13 pages.
"Foreign Office Action", CN Application No. 201210368101.5, Jun. 20, 2014, 7 pages.
"Foreign Office Action", CN Application No. 201210368224.9, Jun. 5, 2014, 11 pages.
"Foreign Office Action", CN Application No. 201210377115.3, Aug. 27, 2014, 18 pages.
"Foreign Office Action", CN Application No. 201210377215.6, Mar. 24, 2014, 16 pages.
"Foreign Office Action", CN Application No. 201210462710.7, Mar. 5, 2014, 12 pages.
"Non-Final Office Action", U.S. Appl. No. 13/307,852, May 16, 2014, 4 pages.
"Non-Final Office Action", U.S. Appl. No. 13/308,210, Aug. 18, 2014, 6 pages.
"Non-Final Office Action", U.S. Appl. No. 13/327,250, Sep. 15, 2014, 10 pages.
"Notice of Allowance", U.S. Appl. No. 13/307,852, Sep. 12, 2014, 4 pages.
"Notice of Allowance", U.S. Appl. No. 13/308,106, Jun. 27, 2014, 7 pages.
"Supplemental Notice of Allowance", U.S. Appl. No. 13/307,994, Aug. 8, 2014, 2 pages.
Goldberg, et al., "Joint Direction-of-Arrival and Array-Shape Tracking for Multiple Moving Targets", IEEE International Conference on Acoustic, Speech, and Signal Processing, Apr. 25, 1997, 4 pages.
"Final Office Action", U.S. Appl. No. 13/327,308, filed Dec. 2, 2014, 6 pages.
"Foreign Office Action", CN Application No. 201210377130.8, Sep. 28, 2014, 7 pages.
"Foreign Office Action", CN Application No. 201210485807.X, Oct. 8, 2014, 10 pages.
"Foreign Office Action", CN Application No. 201210521742.X, Oct. 8, 2014, 16 pages.
"Foreign Office Action", GB Application No. 1121147.1, Apr. 25, 2014, 2 pages.
"Non-Final Office Action", U.S. Appl. No. 13/212,633, filed Nov. 28, 2014, 16 pages.
"Notice of Allowance", U.S. Appl. No. 13/308,210, filed Dec. 16, 2014, 6 pages.
"Supplemental Notice of Allowance", U.S. Appl. No. 13/307,852, filed Oct. 22, 2014, 2 pages.
"Non-Final Office Action", U.S. Appl. No. 13/212,688, filed Feb. 27, 2015, 23 pages.
"Corrected Notice of Allowance", U.S. Appl. No. 13/307,852, filed Feb. 20, 2015, 2 pages.
"Corrected Notice of Allowance", U.S. Appl. No. 13/307,852, filed Dec. 18, 2014, 2 pages.
"Corrected Notice of Allowance", U.S. Appl. No. 13/308,210, filed Feb. 17, 2015, 2 pages.
"Foreign Notice of Allowance", CN Application No. 201210368224.9, Jan. 6, 2015, 3 pages.
"Foreign Notice of Allowance", CN Application No. 201210377130.8, Jan. 17, 2015, 3 pages.
"Foreign Notice of Allowance", CN Application No. 201210462710.7, Jan. 6, 2015, 6 pages.
"Foreign Office Action", CN Application No. 201210377215.6, Jan. 23, 2015, 11 pages.
"Foreign Office Action", CN Application No. 201280043129.X, Dec. 17, 2014, 8 pages.
"Foreign Office Action", EP Application No. 12809381.2, Feb. 9, 2015, 8 pages.
"Foreign Office Action", EP Application No. 12878205.9, Feb. 9, 2015, 6 pages.
"Notice of Allowance", U.S. Appl. No. 13/327,250, filed Jan. 5, 2015, 9 pages.
"Notice of Allowance", U.S. Appl. No. 13/341,610, filed Dec. 26, 2014, 8 pages.

* cited by examiner

PROCESSING SIGNALS

RELATED APPLICATION

This application claims priority under 35 U.S.C. §119 or 365 to Great Britain, Application No. GB1116840.8, filed Sep. 30, 2011. The entire teachings of the above application are incorporated herein by reference.

TECHNICAL FIELD

The present invention relates to processing signals received at a device.

BACKGROUND

A device may have input means that can be used to receive transmitted signals from the surrounding environment. For example, a device may have audio input means such as a microphone that can be used to receive audio signals from the surrounding environment. For example, a microphone of a user device may receive a primary audio signal (such as speech from a user) as well as other audio signals. The other audio signals may be interfering audio signals received at the microphone of the device, and may be received from an interfering source or may be ambient background noise or microphone self-noise. The interfering audio signals may disturb the primary audio signals received at the device. The device may use the received audio signals for many different purposes. For example, where the received audio signals are speech signals received from a user, the speech signals may be processed by the device for use in a communication event, e.g. by transmitting the speech signals over a network to another device which may be associated with another user of the communication event. Alternatively, or additionally, the received audio signals could be used for other purposes, as is known in the art.

In other examples, a device may have receiving means for receiving other types of transmitted signals, such as general broadband signals, general narrowband signals, radar signals, sonar signals, antenna signals, radio waves or microwaves. The same situations can occur for these other types of transmitted signals whereby a primary signal is received as well as interfering signals at the receiving means. The description below is provided mainly in relation to the receipt of audio signals at a device, but the same principles will apply for the receipt of other types of transmitted signals at a device, such as general broadband, general narrowband signals, radar signals, sonar signals, antenna signals, radio waves and microwaves as described above.

In order to improve the quality of the received audio signals, (e.g. the speech signals received from a user for use in a call), it is desirable to suppress interfering audio signals (e.g. background noise and interfering audio signals received from interfering audio sources) that are received at the microphone of the user device.

The use of stereo microphones and other microphone arrays in which a plurality of microphones operate as a single audio input means is becoming more common. The use of a plurality of microphones at a device enables the use of extracted spatial information from the received audio signals in addition to information that can be extracted from an audio signal received by a single microphone. When using such devices one approach for suppressing interfering audio signals is to apply a beamformer to the audio signals received by the plurality of microphones. Beamforming is a process of focussing the audio signals received by a microphone array by applying signal processing to enhance particular audio signals received at the microphone array from one or more desired locations (i.e. directions and distances) compared to the rest of the audio signals received at the microphone array. For simplicity we will describe the case with only a single desired direction herein, but the same method will apply when there are more directions of interest. As is known in the art, the problem of solving for multiple desired directions of arrival at the device may not be trivial as the number of desired directions increases, and for large numbers of desired directions it may not be possible to determine all of the desired directions of arrival. However, the embodiments of the present invention described herein are not limited only to situations in which the directions of arrival of particular audio signals can be determined, but can also be applied even if the locations of the interfering sources cannot be uniquely determined. The angle (and/or distance) from which the desired audio signal is received at the microphone array, so-called Direction of Arrival ("DOA") information can be determined or set prior to the beamforming process. It can be advantageous to set the desired direction of arrival to be fixed since the estimation of the direction of arrival may be complex. However, in alternative situations it can be advantageous to adapt the desired direction of arrival to changing conditions, and so it may be advantageous to perform the estimation of the desired direction of arrival in real-time as the beamformer is used. It is also possible to estimate only the signal delays corresponding to particular directions (and possibly also distances) of arrival which we in the following also will denote as DOA information. Adaptive beamformers update their time varying filter coefficients in a way that incorporates the DOA information. This is done such that when processing the audio signals received by the plurality of microphones a "beam" is formed whereby a high gain is applied to desired audio signals received by the microphones from a desired location (i.e. a desired direction and distance) and a low gain is applied in the directions to any other (e.g. interfering) signal sources.

The output of the beamformer can be further processed in the device in the same way as a received audio signal from a single microphone may be processed, e.g. for transmission to another device as part of a communication event. For example, the output of the beamformer may be supplied as an input signal to at least one of an Acoustic Echo Cancellation (AEC) stage, an Automatic Gain Control (AGC) processing stage and a single channel noise reduction stage in the device.

Data-adaptive beamformers usually compute the coefficients based on averaged statistics of the received audio signals. The averaged statistics of the received audio signals enable the beamformer coefficients to be adapted to the received audio signals such that the beamformer has particular characteristics. For example, the averaged statistics may comprise an averaged covariance matrix of the received audio signals at the microphones. The covariance matrix can be used in order to compute the beamformer coefficients such that the beamformer has particular characteristics. For example, the Minimum Variance Distortionless Response (MVDR) beamformer, also known as the Capon beamformer, is a beamformer that adapts the beamformer coefficients applied to the audio signals to minimize the energy of the output signal based on the input signals under a constraint of not distorting the primary audio signals received with a principal direction of arrival at the device (i.e. audio signals received from the direction of focus of the beamformer). However, the MVDR beamformer tends to distort sound that is arriving from directions other than the principal direction of arrival at the device.

Where the beamformer coefficients are computed based on an averaged covariance matrix of the received audio signals, a scaled identity matrix may be added to the covariance matrix in order to control the condition number of the covariance matrix before inverting it and using it to compute the coefficients of the beamformer. The identity matrix can be interpreted as corresponding to a covariance matrix that is obtained on average when injecting spatially and temporally white noise as an artificial source data in the sensor data for the received audio signals.

SUMMARY

The inventors have realized that in the data-adaptive beamformers of the prior art the statistical estimates for the received data need to be computed in real time and since this typically has to be done for each sample or frame of the received signal this computation could prove to be rather computationally complex and could require lots of storage for storing the statistical estimates. This is a particular problem for the implementations of Linearly Constrained Minimum Variance (LCMV) beamformers which require the averaged covariance matrix of the received input signals to be computed. The computational complexity and the requirement for large amounts of storage is more problematic in devices which do not have high levels of processing power or large amounts of memory, for example user devices, in particular mobile user devices, which may have limited processing power and memory due to the requirement that they are cheap, small and/or light.

Embodiments of the invention avoid the need to compute statistical estimates for the received signals in real time in order to compute the beamformer coefficients. Furthermore, embodiments of the invention provide more precise control for how fast and in what way changes in the desired beamformer behavior are realized than what is provided by the data-adaptive beamformers of the prior art.

According to a first aspect of the invention there is provided a method of computing beamformer coefficients at a device, the method comprising: storing a plurality of sets of theoretical statistical data for a respective plurality of theoretical signals in a store, each theoretical signal having its own particular attributes, the statistical data being for use in computing beamformer coefficients for application by a beamformer to signals received at the device; receiving signals at an input of the device; determining, for the plurality of theoretical statistical data sets, a respective plurality of weights based on an analysis of the extent to which the received signals have the particular attributes of the theoretical signals; retrieving the plurality of theoretical statistical data sets from the store; calculating a statistical data set for the received signals by performing a weighted sum of the retrieved plurality of theoretical statistical data sets using the determined respective plurality of weights; and computing beamformer coefficients based on the calculated statistical data set for the received signals, said beamformer coefficients being for application by a beamformer to the received signals for generating a beamformer output.

Advantageously, in preferred embodiments the calculation of a statistical data set for the received signals is performed as a weighted sum. This may reduce the computational complexity of the method. This is achieved by calculating and storing the theoretical statistical data sets based on theoretical signals which may be received at the device. Then when signals are received at the device, the device can analyze the received signals to determine the extent to which the received signals match the theoretical signals and thereby determine weights for performing the weighted sum of the theoretical statistical data sets in order to calculate the statistical data set for the received signals. Performing a weighted sum may be less computationally complex than calculating the statistical data from the received signals according to methods of the prior art. The storage requirements of preferred embodiments may be less than for the data-adaptive beamformers of the prior art because in preferred embodiments of the present invention all of the estimated statistical data for each sample or frame of the received signals does not need to be stored.

It can therefore be appreciated that embodiments of the present invention provide a method for reducing the computational complexity and storage requirements for data-adaptive beamformers that form their characteristics based on averaged statistics of received signals. By replacing the actual statistical data averaging operations of the prior art with a weighted mixture of parameterized and tabularized theoretical statistical data sets the process of computing the statistical data set by performing statistical operations on the actual received signals in real-time is eliminated.

Furthermore, the beamformer may operate in a number of modes in which the beampattern may be calculated in a different way based on the averaged statistical data of the received signals. In the data-adaptive beamformers of the prior art, there would be a time lag between initiating a switch of the mode of the beamformer and the implementation of the new mode of the beamformer, during which statistical data is collected from the received signals for the new mode. This time lag, or delay, may be a problem in the prior art beamformers. Advantageously, preferred embodiments of the present invention do not require the collection of statistical data from the received signals before the new mode of the beamformer can be implemented. Thus, the delay before an accurate statistical data set can be calculated for the received signals according to the new beamformer mode is reduced.

For covariance-matrix based beamformers, embodiments of the present invention provide more control over the beamformer than just adding the scaled identity matrix to the covariance matrix. In particular, embodiments of the present invention allow the weights for the plurality of theoretical statistical data sets to be varied, to thereby vary the beamformer characteristics.

The method may further comprise determining the plurality of sets of theoretical statistical data.

The method may further comprise the beamformer applying the computed beamformer coefficients to the received signals, thereby generating a beamformer output.

The statistical data sets may for example be covariance matrices, cokurtosis tensors or coskewness tensors.

Said particular attributes of a signal may comprise a direction from which the signal is received at the input. Said particular attributes of a signal may comprise a distance from which the signal is received at the input. Said particular attributes of a signal may comprise a spectral shape of the signal. The spectral shape may be that of white noise.

The method may further comprise determining a mode in which the device is operating, wherein at least one of: (i) said determination of the plurality of weights is performed in dependence upon the determined mode, and (ii) the ones of the theoretical data sets to be included in said weighted sum are selected based on the determined mode. The mode may be determined based on characteristics of the received signals. The mode may be determined based on an input from a user of the device. The mode may be determined based on an analysis of signals that are output from the device, for example signals output from the device that would lead to an echo being received at the input means.

The step of calculating the statistical data set for the received signals may include adding a normalizing data set to the weighted sum of the retrieved plurality of theoretical statistical data sets. The normalizing data set may be a weighted identity matrix.

The step of calculating the statistical data set for the received signals may be performed in dependence upon a determination that the beamformer coefficients are to be updated. The method may further comprise performing said determination that the beamformer coefficients are to be updated, said determination being based on characteristics of at least one of: (i) the received signals, and (ii) the beamformer output.

The step of storing the plurality of theoretical statistical data sets in the store may comprise storing the plurality of theoretical statistical data sets in a tabularized or parameterized form.

The beamformer coefficients may be computed so as to minimize the power in the beamformer output within beamforming constraints of the beamformer.

The method may further comprise using the beamformer output to represent the signals received at the input for further processing within the device.

The signals may be one of: (i) audio signals, (ii) broadband signals, and (iii) narrowband signals.

According to a second aspect of the invention there is provided a device for computing beamformer coefficients, the device comprising: a store for storing a plurality of sets of theoretical statistical data for a respective plurality of theoretical signals, each theoretical signal having its own particular attributes, the statistical data being for use in computing beamformer coefficients for application by a beamformer to signals received at the device; an input for receiving signals; means for determining, for the plurality of theoretical statistical data sets, a respective plurality of weights based on an analysis of the extent to which the received signals have the particular attributes of the theoretical signals; means for retrieving the plurality of theoretical statistical data sets from the store; means for calculating a statistical data set for the received signals by performing a weighted sum of the retrieved plurality of theoretical statistical data sets using the determined respective plurality of weights; and means for computing beamformer coefficients based on the calculated statistical data set for the received signals, said beamformer coefficients being for application by a beamformer to the received signals for generating a beamformer output.

In some embodiments the signals are audio signals and the input comprise a plurality of microphones for receiving the audio signals.

The device may further comprise a beamformer configured to apply the computed beamformer coefficients to the received signals, to thereby generate a beamformer output. The beamformer may be a Minimum Variance Distortionless Response beamformer.

According to a third aspect of the invention there is provided a computer program product for computing beamformer coefficients for signals received at input means of a device, the computer program product being embodied on a non-transient computer-readable medium and configured so as when executed on a processor of the device to perform the steps of: storing a plurality of sets of theoretical statistical data for a respective plurality of theoretical signals in a store, each theoretical signal having its own particular attributes, the statistical data being for use in computing beamformer coefficients for application by a beamformer to signals received at the device; determining, for the plurality of theoretical statistical data sets, a respective plurality of weights based on an analysis of the extent to which the received signals have the particular attributes of the theoretical signals; retrieving the plurality of theoretical statistical data sets from the store; calculating a statistical data set for the received signals by performing a weighted sum of the retrieved plurality of theoretical statistical data sets using the determined respective plurality of weights; and computing beamformer coefficients based on the calculated statistical data set for the received signals, said beamformer coefficients being for application by a beamformer to the received signals for generating a beamformer output.

BRIEF DESCRIPTION OF THE DRAWINGS

For a better understanding of the present invention and to show how the same may be put into effect, reference will now be made, by way of example, to the following drawings in which.

DETAILED DESCRIPTION

Preferred embodiments of the invention will now be described by way of example only. The preferred embodiments described below relate to the case when the beamformer coefficients are computed based on averaged covariance matrix estimates of the input audio signals. Most LCMV beamformers are based on averaged covariance matrix estimates of the input audio signals. Furthermore, the covariance matrix statistic is an example of where the complexity reduction achieved by the embodiments of the present invention is particularly high. However, other embodiments of the invention may relate to beamformers which use other types of averaged statistical estimates rather than, or in addition to, the averaged covariance matrix estimates. A skilled person would understand how the embodiments described below could be implemented using other types of averaged statistical estimates, such as a cross correlation estimate based on higher order moments, for example an implementation of a coskewness tensor or a cokurtosis tensor.

In the following embodiments of the invention, techniques are described in which the covariance matrix is computed as a weighted sum of the covariance matrices that disturbing signals having certain attributes would theoretically have. Performing a weighted sum of matrices is a much less computationally complex task than performing statistical analysis of received signals in order to calculate the covariance matrix for received audio signals. The embodiments described below relate to the case where the signals are audio signals. However, other embodiments relate to cases where the signals are other types of transmitted signals, such as general broadband signals, general narrowband signals, radar signals, sonar signals, antenna signals, radio waves or microwaves.

Figure 1:
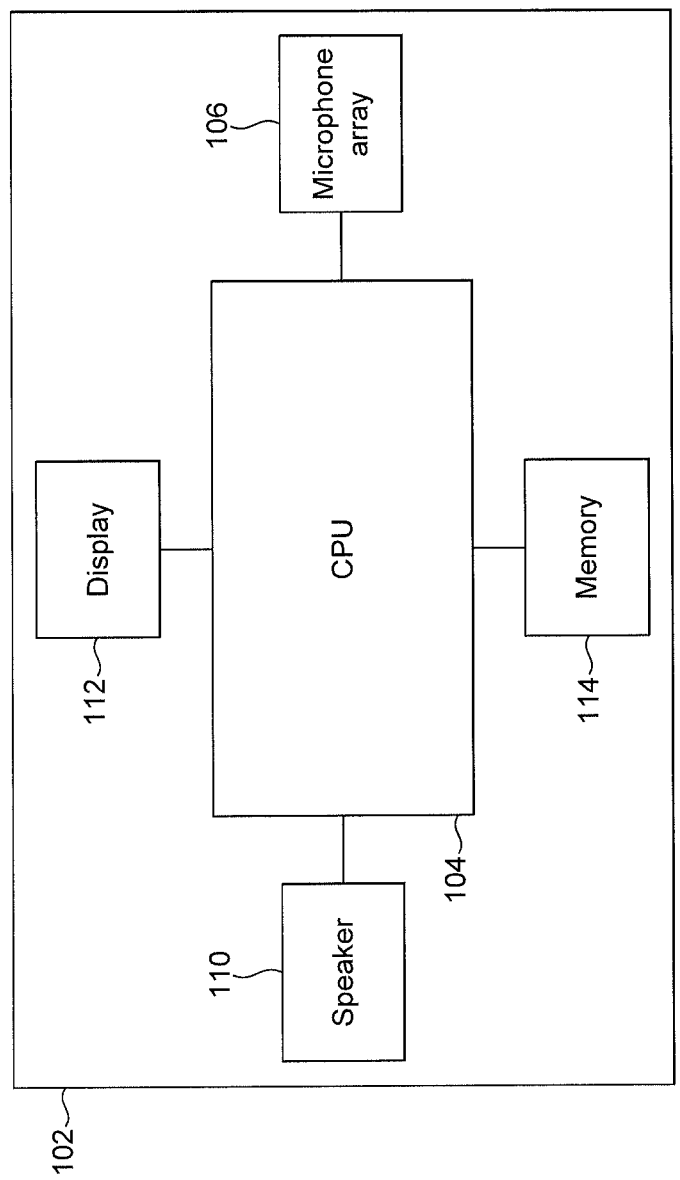
FIG. 1 shows a schematic view of a device according to a preferred embodiment.

Reference is first made to FIG. 1 which illustrates a schematic view of a device 102. The device 102 may be a fixed or a mobile device. The device 102 comprises a CPU 104, to which is connected a microphone array 106 for receiving audio signals, a speaker 110 for outputting audio signals, a display 112 such as a screen for outputting visual data to a user of the device 102 and a memory 114 for storing data.

Figure 2:
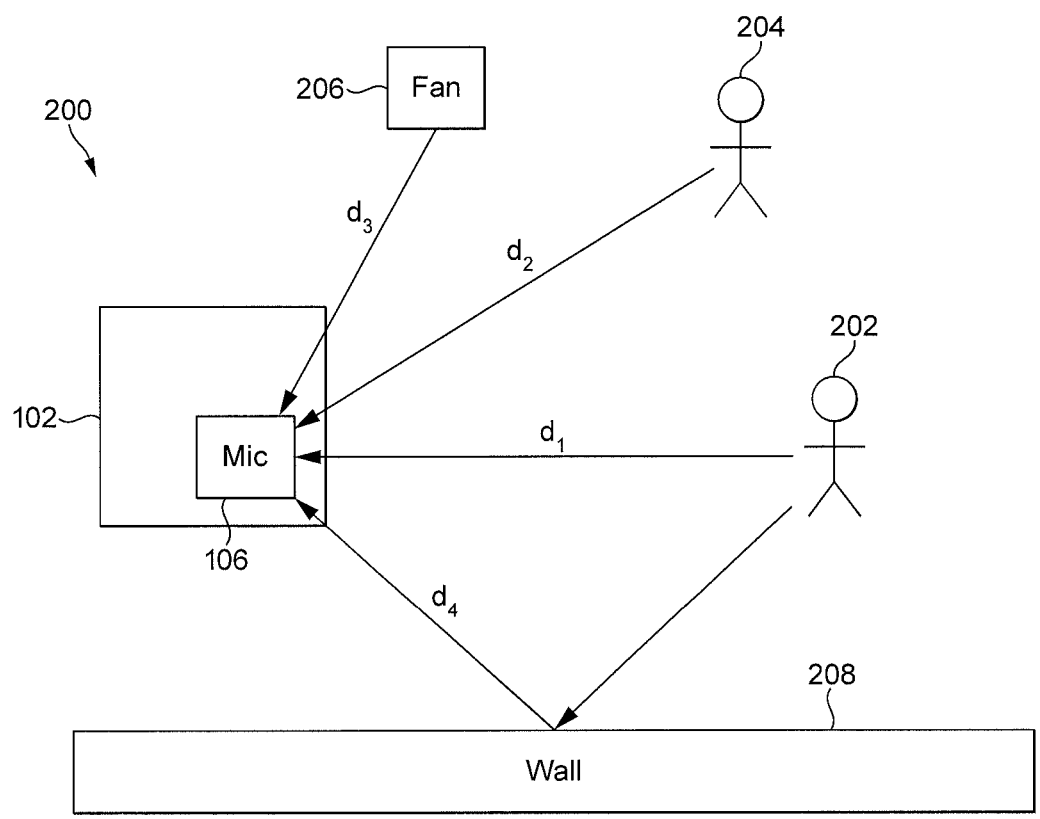
FIG. 2 shows a system according to a preferred embodiment.

Reference is now made to FIG. 2, which illustrates an example environment 200 in which the device 102 operates.

The microphone array 106 of the device 102 receives audio signals from the environment 200. For example, as shown in FIG. 2, the microphone array 106 receives audio signals from a user 202 (as denoted $d_1$ in FIG. 2), audio signals from another user 204 (as denoted $d_2$ in FIG. 2), audio signals from a fan 206 (as denoted $d_3$ in FIG. 2) and audio signals from the user 202 reflected off a wall 208 (as denoted $d_4$ in FIG. 2). It will be apparent to a person skilled in the art that the microphone array 106 may receive other audio signals than those shown in FIG. 2. In the scenario shown in FIG. 2 the audio signals from the user 202 are the desired audio signals, and all the other audio signals which are received at the microphone array 106 are interfering audio signals. In other embodiments more than one of the audio signals received at the microphone array 106 may be considered "desired" audio signals, but for simplicity, in the embodiments described herein there is only one desired audio signal (that being the audio signal from user 202) and the other audio signals are considered to be interference. FIG. 2 shows interference sources being another user 204, a fan 206 or a reflection from a wall 208. Other sources of unwanted noise signals may include for example air-conditioning systems, a device playing music, and microphone self-noise.

The desired audio signal(s) is (are) identified when the audio signals are processed after having been received at the microphone array 106. During processing, desired audio signals are identified based on the detection of speech like characteristics, and a principal direction of a main speaker may be determined. The microphone array 106 may be pre-steered towards the principal direction (e.g. when there is only one desired speaker), such that the determination of the principal direction does not need to be determined in real-time during operation. FIG. 2 shows the main speaker (user 202) as the source of the desired audio signal that arrives at the microphone array 106 from the principal direction $d_1$.

Figure 3:
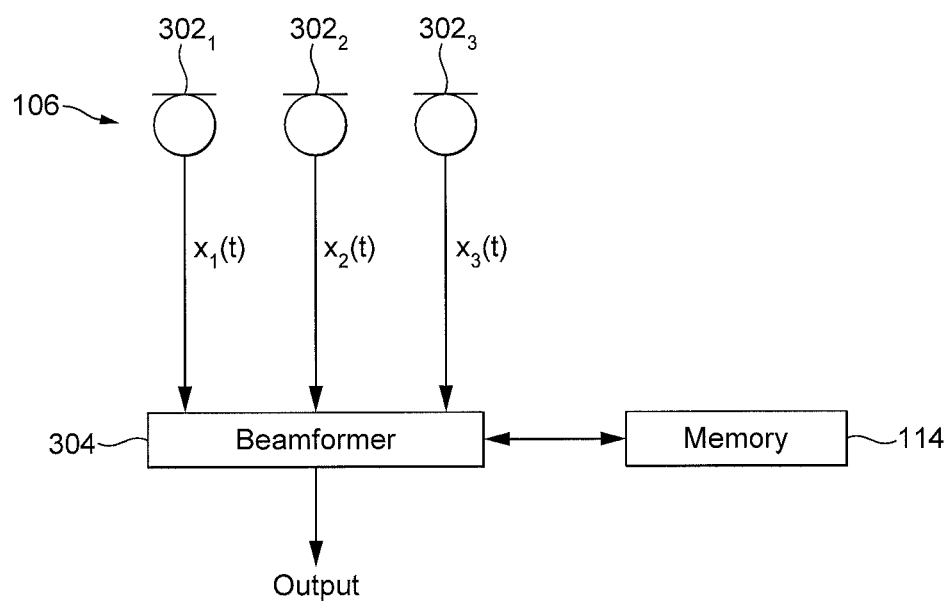
FIG. 3 shows a functional block diagram of elements of a device according to a preferred embodiment.

Reference is now made to FIG. 3 which illustrates a functional representation of elements of the device 102. The microphone array 106 comprises a plurality of microphones $302_1$, $302_2$ and $302_3$. The device 102 further comprises a beamformer 304 which may for example be a Minimum Variance Distortionless Response (MVDR) beamformer. The beamformer 304 may be implemented in software executed on the CPU 104 or implemented in hardware in the device 102. The output of each microphone in the microphone array 106 is coupled to a respective input of the beamformer 304. Persons skilled in the art will appreciate that multiple inputs are needed in order to implement beamforming. The microphone array 106 is shown in FIG. 3 as having three microphones ($302_1$, $302_2$ and $302_3$), but it will be understood that this number of microphones is merely an example and is not limiting in any way.

The beamformer 304 includes means for receiving and processing the audio signals $x_1(t)$, $x_2(t)$ and $x_3(t)$ from the microphones $302_1$, $302_2$ and $302_3$ of the microphone array 106. For example, the beamformer 304 may comprise a voice activity detector (VAD) and a DOA estimation block (not shown in FIG. 3). In operation the beamformer 304 ascertains the nature of the audio signals received by the microphone array 106 and based on detection of speech like qualities detected by the VAD and the DOA estimation block, one or more principal direction(s) of the main speaker(s) is determined. As described above, in other embodiments the principal direction(s) of the main speaker(s) may be pre-set such that the beamformer 304 focuses on fixed directions. In the example shown in FIG. 2 the direction of audio signals ($d_1$) received from the user 202 is determined to be the principal direction. The beamformer 304 uses the DOA information to process the audio signals by forming a beam that has a high gain in the direction from the principal direction ($d_1$) from which wanted signals are received at the microphone array 106 and a low gain in the direction of any interfering noise sources ($d_2$, $d_3$ and $d_4$).

The beamformer 304 can also determine the interfering directions of arrival ($d_2$, $d_3$ and $d_4$), and advantageously the coefficients used by the beamformer 304 can be adapted such that particularly low gains are applied to audio signals received from those interfering directions of arrival in order to suppress the interfering audio signals. As well as distinguishing between directions of arrival of audio signals at the microphone array 106, the beamformer 304 may also distinguish between distances of arrival of audio signals at the microphone array 106. The direction and distance from which an audio signal is received determine a location from which the audio signal is received. Audio signals received from different source locations will have different delay patterns across the plurality of microphones ($302_1$, $302_2$ and $302_3$) of the microphone array 106.

Whilst it has been described above that the beamformer 304 can determine any number of principal directions, the number of principal directions determined affects the properties of the beamformer e.g. for a large number of principal directions the beamformer 304 will apply less attenuation of the signals received at the microphone array from the other (unwanted) directions than if only a single principal direction is determined The output of the beamformer 304 is provided to further processing means of the device 102 in the form of a single channel to be processed. It is also possible to output more than one channel, for example to preserve or to virtually generate a stereo image. The output of the beamformer 304 may be used in many different ways in the device 102 as will be apparent to a person skilled in the art. For example, the output of the beamformer 304 could be used as part of a communication event in which the user 202 is participating using the device 102.

The output of the beamformer 304 may be subject to further signal processing (such as automatic gain control, noise suppression, and/or echo cancelling). The details of such further signal processing is beyond the scope of this invention and so the details of the further signal processing are not given herein, but a skilled person would be aware of ways in which the output of the beamformer 304 may be processed in the device 102.

In operation, the beamformer 304 is arranged to receive the audio signals $x_1$, $x_2$ and $x_3$ from the microphones $302_1$, $302_2$ and $302_3$ of the microphone array 106. The beamformer 304 comprises processing means for determining the beamformer coefficients that it are used to process the audio signals $x_1$, $x_2$ and $x_3$ in order to generate the beamformer output.

In LCMV beamforming, a covariance matrix is calculated for the received audio signals and the beamformer coefficients are computed as a function of that covariance matrix subject to specific beamformer constraints of the particular beamformer. The beamformer constraints ensure that the beamformer fulfill certain criteria (e.g., that the received audio signals are not suppressed in the beamformer look direction, or that the beamformer lobe in the look direction has a certain shape, etc.). The audio signal covariance matrix is used by the beamformer 304 to adaptively compute beamformer coefficients that minimize the power in the beamformer output, subject to the above mentioned beamformer constraints.

An LCMV beamformer of the prior art may estimate the averaged covariance matrix as follows. The covariance matrix R(t) can be found using the equation: $R(t)=E[X(t)X^T(t)]$, where E is the expectation operator (also known as the ensemble average operator) and X(t) is a matrix of received audio signals, and is given by:

$$X(t) = \begin{bmatrix} x_1(t) \\ x_2(t) \\ \vdots \\ x_N(t) \\ x_1(t-1) \\ x_2(t-1) \\ \vdots \\ x_N(t-1) \\ \vdots \\ x_1(t-M) \\ x_2(t-M) \\ \vdots \\ x_N(t-M) \end{bmatrix},$$

where $x_n(t)$ are the input signals received by the N microphones of the microphone array 106 and M is the length of tapped delay line filters used for each input signal, that is, the number of samples of the audio signals $x_n(t)$ which are stored for use in calculating the matrix X(t). It should be noted that the actual covariance matrix format is implementation dependent.

The LCMV beamformer of the prior art may then estimate the expectation in the covariance estimate as:

$\hat{R}(t)=\Sigma_{k=0}^{\infty} w(k)X(t-k)X^T(t-k)$, where w(k) is a weighting function (typically exponentially decaying). In practice, though, w(k) may be selected so that the memory in $\hat{R}(t)$ is limited in time, or such that the covariance estimate is only updated under certain conditions.

The calculation of the expectation in the covariance estimate of the prior art as given above requires multiple vector multiplication and matrix addition operations to be performed. The estimation of the expectation in the covariance estimate is performed for each sample of the received audio signal, so large amounts of processing power are required to perform the multiple operations in real time as the audio signals are received. Furthermore, this method requires the storage of each of the covariance matrix estimates in cache memory of the device 102, which places a large storage burden on the device 102.

In contrast, in preferred embodiments of the present invention the covariance matrix $\hat{R}(t)$ is calculated as a weighted sum of theoretical covariance matrices that theoretical audio signals having particular attributes would have if they were received at the microphone array 106. In the preferred embodiments described herein the particular attributes of the theoretical audio signals relate to the location of the source of the audio signal. In particular, in the preferred embodiments the particular attributes relate to the direction θ and/or the distance d from which the audio signals are arriving at the microphone array 106. The particular attributes of the theoretical audio signals could also include the spectral shape of the theoretical audio signals. In the preferred embodiments described herein, the spectral shape of the theoretical audio signals represents that of white noise, but other spectral shapes could be implemented in other embodiments. The received audio signals can be analyzed to determine the extent to which they exhibit the particular attributes of the different theoretical audio signals to thereby determine the weights for the theoretical covariance matrices in the weighted sum. For example, if the received audio signals strongly exhibit the particular attributes of a first one of the theoretical audio signals then the weight associated with the corresponding first one of the theoretical covariance matrices will be high. In contrast, if the received audio signals weakly exhibit the particular attributes of a second one of the theoretical audio signals then the weight associated with the corresponding second one of the theoretical covariance matrices will be low. Furthermore, if the received audio signals do not exhibit the particular attributes of a third one of the theoretical audio signals at all then the weight associated with the corresponding third one of the theoretical covariance matrices will be very low, and may be set to zero—i.e. such that the third one of the theoretical covariance matrices is not included in the weighted sum. For perceptual, or numerical, reasons it may be chosen to lower limit the weights, and thereby ensure that all are contributing to the resulting covariance matrix. As an example, when the particular attributes include the angle from which the audio signals are received, then the audio signals $x_1$ to $x_N$ are analyzed to determine the extent to which the received audio signals include audio signals received from particular angles to determine the weights for the theoretical covariance matrices of theoretical audio signals arriving from those angles for use in the weighted sum. In this way the covariance matrix for the received audio signals is simply calculated as a weighted sum of theoretical, or "idealized", covariance matrices, with the weights being determined by how closely the received audio signals match the attributes of the theoretical covariance matrices. This removes the need to perform the vector multiplication and matrix addition operations of the prior art technique described above for calculating covariance matrices for the received audio signals in real time (that is, "on-the-fly") as the received audio signals are received.

For example, in the preferred embodiments the covariance matrix $\hat{R}(t)$ is calculated using the equation:

$\hat{R}(t)=\Sigma_{k=0}^{K-1}\gamma_{(\theta,d)_k}(t)R_{(\theta,d)_k}+P$ \hfill (1)

where $R_{(\theta,d)_k}$ is the covariance matrix a disturbing signal with a certain characteristic coming from a location in the kth region given by a combination of the direction and the distance to the region $(\theta, d)_k$ would theoretically have. The locations of the theoretical audio signals are discretized into K regions denoted by $(\theta, d)_k$. $\gamma_{(\theta,d)_k}(t)$ is the weighting (i.e. importance) of the kth region $(\theta, d)_k$ (i.e. the kth combination of direction θ and distance d) compared to the other directions and distances in the optimization of the beamformer coefficients. In other words $\gamma_{(\theta,d)_k}(t)$ is the extent to which the received audio signals are received from the direction and distance $(\theta, d)_k$. P is a general matrix corresponding to ambient noise that is received at the microphones of the microphone array. P may be mutually independent between the microphone signals in a spatial sense. The ambient noise may have a flat or a non-flat spectral shape. In one example in which the ambient noise has a flat spectral shape, P may be chosen as a scaled identity matrix ($\gamma_{Ambient}(t)I$), where I is the identity matrix and $\gamma_{Ambient}(t)$ corresponds to the weighting (importance) of the identity matrix in the sum, which serves as regularization noise which can be interpreted as being spatially flat. In other words, in this example, $\gamma_{Ambient}(t)$ is the extent to which the received audio signals include omnidirectional white noise.

Figure 4:
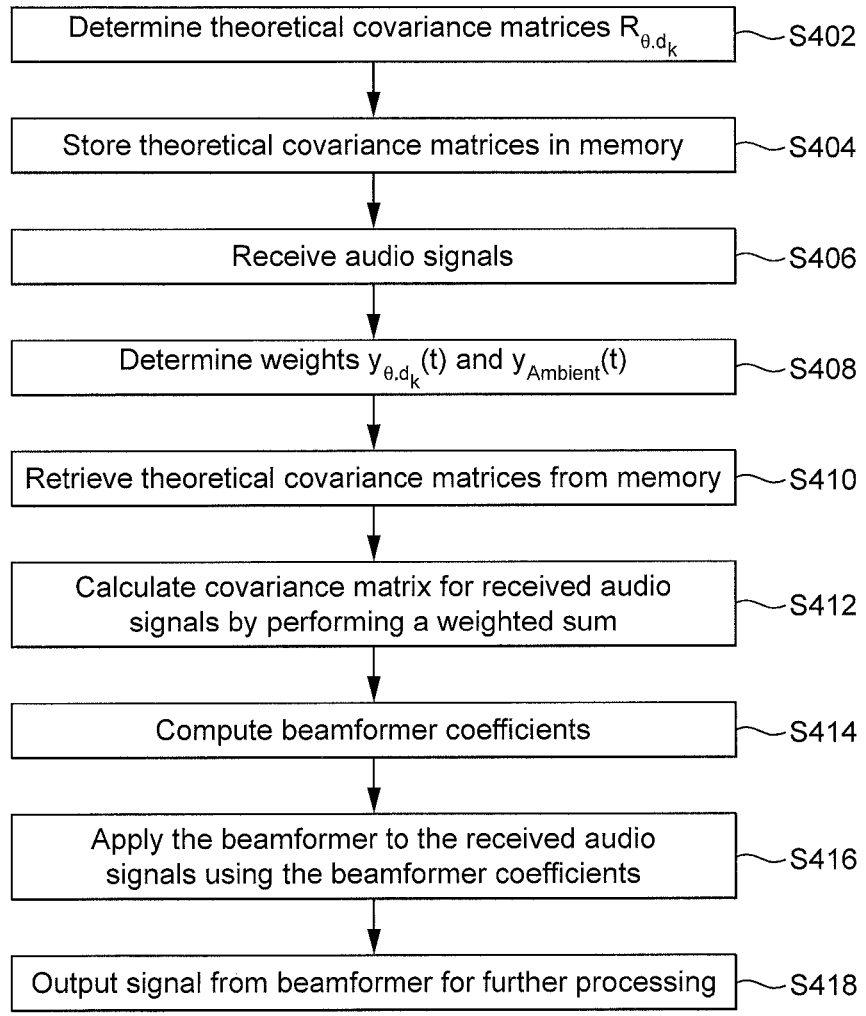
FIG. 4 is a flow chart for a process of processing audio signals according to a preferred embodiment.

With reference to FIG. 4 there is now described a method of processing audio signals according to a preferred embodiment. In step S402 the theoretical, or "idealized", covariance matrices $R_{(\theta,d)_k}$ are determined Each theoretical covariance matrix is determined by calculating the covariance matrix that would be produced if a disturbing signal arrived at the microphone array 106 with the particular attributes of the theoretical audio signal, that is, the angle and distance $(\theta, d)_k$ from which the theoretical audio signal is received at the microphone array 106 and/or the spectral shape of the theoretical audio signal.

In step S404 the theoretical covariance matrices $R_{(\theta,d)_k}$ that were determined in step S402 are stored in the memory 114 of the device. The memory 114 may be implemented, for example, as RAM in the device 102. The theoretical covariance matrices $R_{(\theta,d)_k}$ are stored in the memory 114 in a tabularised or parameterized form, so that they can be easily and quickly retrieved. Steps S402 and S404 can be performed before the calculation of a covariance matrix is required for some received audio signals.

In step S406 (which may be performed some time after steps S402 and S404 are performed) audio signals are received at the microphones ($302_1$, $302_2$ and $302_3$) of the microphone array 106. The audio signals are received, for example, from the user 202, the user 204, the fan 206 and the wall 208 as shown in FIG. 2. Other interfering audio signals, such as background noise, may also be received at the microphones ($302_1$, $302_2$ and $302_3$) of the microphone array 106. The audio signals $x_1(t)$, $x_2(t)$ and $x_3(t)$ received by each microphone ($302_1$, $302_2$ and $302_3$) of the microphone array 106 are passed to the beamformer 304.

In step S408 the beamformer 304 determines the weights $\gamma_{(\theta,d)_k}(t)$ and $\gamma_{Ambient}(t)$, in the example when $P=\gamma_{Ambient}(t)I$. In other examples, the weight $\gamma_{(\theta,d)_k}(t)$ and the general matrix P are determined. When analyzing the multi-microphone input signals with the purpose of enhancing one or more audio signals (e.g. a speech signal from the user 202), it is identified from where in space the audios signals are arriving. Alternatively, it may simply be assumed that the desired audio signals are coming from a certain location (i.e. direction and distance). As described in more detail below in relation to FIG. 5, the direction of arrival is determined from the delay between the signal of each microphone, $302_1$, $302_2$ and $302_3$ of the microphone array 106, with the highest correlation. Embodiments of the invention are applicable even if, e.g., the distance between the microphones $302_1$, $302_2$ and $302_3$ in the microphone array 106 is too large for the directions of arrival to be determined unambiguously. Indeed, any (even if it is ambiguous) source location (that is, direction and distance of arrival) can be used to choose weights $\gamma_{\theta,d_k}(t)$ that will ensure proper beamformer performance).

The beamformer 304 determines the direction of arrival of audio signals received at the microphones $302_1$, $302_2$ and $302_3$ of the microphone array 106. The beamformer 304 may also determine the distance from which audio signals are received at the microphones $302_1$, $302_2$ and $302_3$ of the microphone array 106. Based on the direction and distance from which the audio signals are received the weights can be determined. Where the received audio signals have high energy for a particular angle and/or direction $(\theta, d)_k$ then the weight for that angle and/or distance $\gamma_{(\theta,d)_k}(t)$ is set to a high value. Likewise where the received audio signals have low energy for a particular angle and/or direction $(\theta, d)_k$ then the weight for that angle and/or distance $\gamma_{(\theta,d)_k}(t)$ is set to a low value. The matrix P is calculated based on the received audio signals (for example, the weight $\gamma_{Ambient}(t)$ which is applied to the identity matrix, I, in the sum may be calculated based on the received audio signals) and is calculated to ensure that the covariance matrix $\hat{R}(t)$ is not ill conditioned, thereby ensuring that the inverse of the covariance matrix can be used to compute the beamformer coefficients accurately. In this sense, the estimation of the weight $\gamma_{(\theta,d)_k}(t)$ and the matrix P is performed using source localization and noise estimation techniques. In a preferred embodiment of the invention, the weights $\gamma_{(\theta,d)_k}(t)$ are controlled by directional regularization, where instead of injecting regularization noise into the input signals, the regularization amounts in each of the K regions (i.e. combinations of angular direction and distance) instead determine the weights. This is mathematically equivalent to the case where the input signals consist only of statistically independent regularization noise of the spectrum that was used to compute the theoretical covariance matrices $R_{(\theta,d)_k}$.

Once the interfering directions of arrival have been determined then in step S410 the theoretical covariance matrices $R_{(\theta,d)_k}$ are retrieved from the memory 114. Step S410 may involve retrieving all of the theoretical covariance matrices $R_{(\theta,d)_k}$ which were determined in step S402. Alternatively, step S410 may involve retrieving only those theoretical covariance matrices $R_{(\theta,d)_k}$ for which the corresponding weight $\gamma_{(\theta,d)_k}(t)$ is not zero.

In step S412 the covariance matrix $\hat{R}(t)$ is calculated for the received audio signals by performing the weighted sum in accordance with equation (1) above using the retrieved theoretical covariance matrices $R_{(\theta,d)_k}$ and the weights $\gamma_{(\theta,d)_k}(t)$. The computation in step S412 requires only addition and matrix scaling operations to be performed. No matrix multiplication or vector multiplication operations are required in step S412.

In step S414 the beamformer 304 computes the beamformer coefficients based on the covariance matrix $\hat{R}(t)$ calculated in step S412. This may involve determining the inverse of the covariance matrix $\hat{R}(t)$. The details for determining the beamformer coefficients based on a covariance matrix are known to people skilled in the art. For example, the beamformer coefficients may be determined subject to a number of constraints which are relevant for the particular beamformer 304 that is being implemented. For example, where the beamformer 304 is an MVDR beamformer, it is adapted so as to minimize the energy in the beamformer output within the constraint of not distorting the desired audio signals received with the principal direction of arrival at the microphone array 106 (e.g. at 0 degrees). Other types of beamformers may have other constraints subject to which the beamformer coefficients should be determined. The beamformer coefficients describe to the beamformer 304 how to process the audio signals ($x_1$, $x_2$ and $x_3$) to generate the beamformer output.

In step S416 the beamformer 304 applies the beamformer coefficients computed in step S414 to the audio signals ($x_1$, $x_2$ and $x_3$) to thereby generate the beamformer output. In step S418 the beamformer output is output from the beamformer 304 for further processing in the device 102.

The calculation of the covariance matrix $\hat{R}(t)$ using the weighted sum as described above provides for a computationally simple method which can be calculated quickly in real time for the received audio signals on-the-fly.

The operation of direction of arrival (DOA) estimation performed by the beamformer 304 to determine a direction of arrival of a received audio signal, e.g. from the user 202 will now be described in more detail with reference to FIG. 5.

The DOA information is estimated by the beamformer 304 by means of estimating the time delay, e.g. using correlation methods, between received audio signals at the plurality of microphones of the microphone array 106, and estimating the source of the audio signal using the a priori knowledge about the location of the plurality of microphones $302_1$, $302_2$ and $302_3$ of the microphone array 106.

Figure 5:
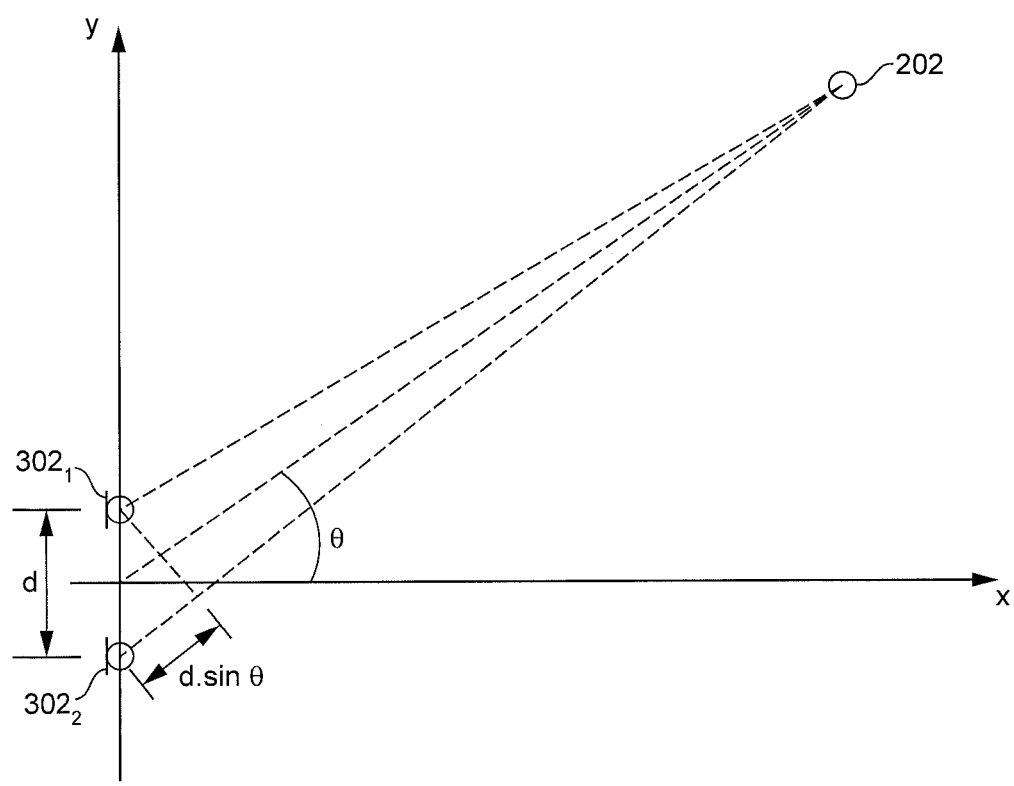
FIG. 5 shows a diagram representing how Direction of Arrival information is estimated in one embodiment.

As an example, FIG. 5 shows microphones $302_1$ and $302_2$ of the microphone array 106 receiving audio signals on two separate input channels from the audio source 202. For ease of understanding FIG. 5 shows a point source 202 where waves are propagating in a circular motion away from the source 202. This is how it is in real-life, but the equation shown below assumes that the received audio signals are received at the microphones $302_1$ and $302_2$ as plane waves. This assumption is a good assumption when the point source 202 is 'far enough' away from the microphones $302_1$ and $302_2$. However, it should be noted that the plane wave assumption is merely used to simplify the math, and is not in any way a pre-requisite for the current invention, which works equally well without the plane wave assumption. The direction of arrival of the audio signals at microphones $302_1$ and $302_2$ separated by a distance, d, can under a plane wave assumption, be estimated using equation (1):

$$\theta = \arcsin\left(\frac{\tau_D v}{d}\right) \quad (1)$$

where v is the speed of sound, and $\tau_D$ is the difference between the times that the audio signals from the source 202 arrive at the microphones $302_1$ and $302_2$—that is, the time delay. The distance, d, is a known parameter for the microphone array 106 and the speed of sound, v, is known (approximately 340 m/s). The time delay, $\tau_D$, is obtained as the time lag that maximizes the cross-correlation between the received interfering audio signals at the outputs of the microphones $302_1$ and $302_2$. The angle, $\theta$, may then be found which corresponds to this time delay using equation (1) given above. Speech characteristics can be searched for in audio signals received with the delay of high cross-correlations to determine one or more interfering direction(s) of any interfering speaker(s).

It will be appreciated that calculating a cross-correlation of signals is a common technique in the art of signal processing and will not be describe in more detail herein.

As described above, the theoretical covariance matrices $R_{(\theta,d)_k}$ are computed offline (i.e. before they are needed) and are stored in the memory 114. Therefore the computation of $\hat{R}(t)$ requires only a linear combination of K matrices and one identity matrix to be performed in real time. Furthermore, in contrast to computing the covariance matrix estimate as described in the prior art where $\hat{R}(t)$ needs to be updated for each sample regardless of whether $\hat{R}(t)$ is going to be used at a certain time or not, embodiments of the invention only require $\hat{R}(t)$ to be computed when it is to be used (i.e. when conditions have changed). That is, a determination may be made that the beamformer coefficients are to be updated, and responsive to that determination the covariance matrix $\hat{R}(t)$ may be calculated according to the method described above. Therefore if it is not determined that the beamformer coefficients are to be updated then the covariance matrix $\hat{R}(t)$ is not required to be updated, and as such, does not need to be re-calculated. The determination that the beamformer coefficients are to be updated may be based on characteristics of the received audio signals, for example if the characteristics of the received audio signals have changed significantly then the beamformer coefficients may need to be re-computed, whereas if the characteristics of the received audio signals have not changed significantly then the beamformer coefficients may not need to be re-computed. The determination that the beamformer coefficients are to be updated may also be based on characteristics of the beamformer output, for example if the characteristics of the beamformer output show that the beamformer is not performing well (e.g. it is not minimizing the energy of the received audio signals well or it is not conforming to the beamformer constraints such as the constraint that the primary audio signal should not be distorted) then the beamformer coefficients may need to be re-computed, whereas if the characteristics of the beamformer output show that the beamformer is performing well (e.g. it is minimizing the energy of the received audio signals well and it is conforming to the beamformer constraints such as the constraint that the primary audio signal should not be distorted) then the beamformer coefficients may not need to be re-computed.

When applying embodiments of the invention in conjunction with a directional regularization method, $R_{(\theta,d)_k}$ is typically chosen as a covariance matrix for a white noise source (in order to control the frequency behavior of the beamformer coefficients similarly for all frequencies).

Apart from being computationally efficient, embodiments of the invention also offer a good way to rapidly switch between different states of the interferer configuration (i.e. different interference environments), which can be useful if there are clearly specified modes in which the beamformer should be operating in different environments. The operating mode of the device 102 may be determined based on characteristics of the received audio signals. For example, the beamformer 304 may have a particular mode of operation for use when there is echo present in the received audio signals. The operating mode of the device 102 may also be determined based on an input received from the user 202 of the device 102, whereby the user 202 can select a particular operating mode for the beamformer 304. The operating mode of the device 102 may also be determined based on an analysis of signals that are played out from the device 102 (e.g. from the speaker 110). That is, the operating mode of the device 102 may be determined based on an analysis of signals output from the device 102 that would lead to an echo being received at the microphone array 106.

For the prior art methods of calculating the covariance matrix estimate, the actual covariance matrix estimate averaging would need to be modified and still it would not be possible to perform instant changes since care has to be taken so that sufficient averaging is performed for the estimates to be reasonable (or even full rank). According to preferred embodiments of the present invention the operating mode of the device can be determined and the weighted sum shown in equation (1) above can be adapted to suit the mode without delay. For example, as soon as it is determined that echo is present in the received audio signals the weighted sum of equation (1) can be adapted such that the subsequently updated beamformer coefficients are adapted to suit the new operating mode instantly, i.e. without delay. For example, the determination of the weights may depend upon the operating mode of the device. As another example, the ones of the theoretical covariance matrices $R_{(\theta,d)_k}$ which are to be included in the weighted sum can be selected based on the operating mode of the device.

The embodiments of the invention in which the beampattern is computed based on the weighted sum shown in equation (1), may improve the operation of the beamformer 304 by at least some of:

Reducing the computational complexity of the beamforming process by:
(i) avoiding the need to compute numerous vector multiplications in order to calculate the covariance matrix $\hat{R}(t)$—instead only matrix additions and scalings are needed (a matrix scaling operation is often much less computationally complex than a matrix multiplication operation); and
(ii) avoiding the need to update the covariance matrix $\hat{R}(t)$ for each sample of the received audio signals—instead the covariance matrix $\hat{R}(t)$ is only computed when it is used;

Reducing the storage requirements of the beamforming process by not having to store the covariance matrix estimate $\hat{R}(t)$ in cache memory—the tabularized or parameterized covariance matrices $\hat{R}(t)$ can instead be stored on lower-speed memory 114;

Allowing for rapid and simple control for switching between different operating modes of the beamformer 304 by just modifying the mixture of the covariance matrices $R_{(\theta,d)_k}$, in contrast to when averaged covariance matrices are used in the prior art; and Allowing adaptation to purely artificial directional regularization signals to be applied in the beamforming process in a significantly simplified manner (in computational terms) by avoiding the need to generate the audio signals corresponding to the artificial sources—instead regularization noise can be added simply by increasing the weight $\gamma_{(\theta,d)_k}$ for a particular one of the theoretical audio signals $R_{(\theta,d)_k}$ which has the attributes required for the regularization noise.

In the example embodiments described above the microphone array 106 is a 1-D array of microphones ($302_1$, $302_2$ and $302_3$) which allows the beamformer 304 to distinguish between audio signals received with different angles in one dimension (e.g. along a horizontal axis). In alternative embodiments, the microphone array 106 may be a 2-D or a 3-D array of microphones which would allow the beamformer 304 to distinguish between audio signals received with different angles in two or three dimensions respectively (e.g. along horizontal, vertical and depth axes).

As described above, the beamformer 304 may be implemented in software executed on the CPU 104 or implemented in hardware in the device 102. When the beamformer 304 is implemented in software, it may be provided by way of a computer program product embodied on a non-transient computer-readable medium which is configured so as when executed on the CPU 104 of the device 102 to perform the function of the beamformer 304 as described above. The method steps S402, S404 and S408 to S418 may be performed by functional blocks of the beamformer 304 (as software or hardware blocks).

Whilst the embodiments described above have referred to a microphone array 106 receiving one desired audio signal ($d_1$) from a single user 202, it will be understood that the microphone array 106 may receive audio signals from a plurality of users, for example in a conference call which may all be treated as desired audio signals. In this scenario multiple sources of wanted audio signals arrive at the microphone array 106.

The device 102 may be a television or a computer or any other suitable device for implementing the invention. Furthermore, the beamformer 304 may be enabled for any suitable equipment using stereo microphone pickup, the methods described above may be enabled as a part of a Voice Quality Enhancement (VQE) module within a device, and run on any suitable platform. The method may advantageously be used in conjunction with a method of Directional Regularization which in that case would be operating using averaged covariance matrix estimates.

Furthermore, while this invention has been particularly shown and described with reference to preferred embodiments, it will be understood to those skilled in the art that various changes in form and detail may be made without departing from the scope of the invention as defined by the appendant claims.

What is claimed is:

1. A method of computing beamformer coefficients at a device, the method comprising:
storing a plurality of theoretical covariance matrices for a respective plurality of theoretical signals in a store, each theoretical signal having its own particular attributes, the theoretical covariance matrices being for use in computing beamformer coefficients for application by a beamformer to signals received at the device;
receiving the signals at an input of the device;
determining, for the plurality of theoretical covariance matrices, a respective plurality of weights based on an analysis of the extent to which the received signals have the particular attributes of the theoretical signals;
retrieving the plurality of theoretical covariance matrices from the store;
calculating a covariance matrix set for the received signals by performing a weighted sum of the retrieved plurality of theoretical covariance matrices using the determined respective plurality of weights; and
computing beamformer coefficients based on the calculated covariance matrix for the received signals, said beamformer coefficients being for application by the beamformer to the received signals for generating a beamformer output.

2. The method of claim 1, further comprising determining the plurality of theoretical covariance matrices.

3. The method of claim 1, further comprising the beamformer applying the computed beamformer coefficients to the received signals, thereby generating the beamformer output.

4. The method of claim 1, wherein said particular attributes of a signal comprise a direction from which the signal is received at the input.

5. The method of claim 1, wherein said particular attributes of a signal comprise a distance from which the signal is received at the input.

6. The method of claim 1, wherein said particular attributes of a signal comprise a spectral shape of the signal.

7. The method of claim 6, wherein the spectral shape is that of white noise.

8. The method of claim 1, further comprising determining a mode in which the device is operating, wherein at least one of said determination of the plurality of weights is performed in dependence upon the determined mode, or the ones of the theoretical covariance matrices to be included in said weighted sum are selected based on the determined mode.

9. The method of claim 8, wherein the mode is determined based on characteristics of the received signals.

10. The method of claim 8, wherein the mode is determined based on an input from a user of the device.

11. The method of claim 8, wherein the mode is determined based on an analysis of signals that are output from the device.

12. The method of claim 1, wherein the calculating the covariance matrix for the received signals includes adding a normalizing data set to the weighted sum of the retrieved plurality of theoretical covariance matrices.

13. The method of claim 12, wherein the normalizing data set is a weighted identity matrix.

14. The method of claim 1, wherein the calculating the covariance matrix for the received signals is performed in dependence upon a determination that the beamformer coefficients are to be updated.

15. The method of claim 14, further comprising performing said determination that the beamformer coefficients are to be updated, said determination being based on characteristics of at least one of the received signals, or the beamformer output.

16. The method of claim 1, wherein said storing the plurality of theoretical covariance matrices in the store comprises storing the plurality of theoretical covariance matrices in a tabularized or parameterized form.

17. The method of claim 1, wherein said beamformer coefficients are computed so as to minimize the power in the beamformer output within beamforming constraints of the beamformer.

18. The method of claim 1, further comprising using the beamformer output to represent the signals received at the input for further processing within the device.

19. The method of claim 1, wherein the signals are one of audio signals, general broadband signals, general narrowband signals, radar signals sonar signals, antenna signals, radio waves, or microwaves.

20. A device for computing beamformer coefficients, the device comprising:
    a store for storing a plurality of sets of theoretical covariance matrices for a respective plurality of theoretical signals, each theoretical signal having its own particular attributes, the theoretical covariance matrices being for use in computing beamformer coefficients for application by a beamformer to signals received at the device;
    an input for receiving signals;
    a processor; and
    a memory comprising instructions executable by the processor to perform operations comprising:
        determining, for the plurality of theoretical covariance matrices, a respective plurality of weights based on an analysis of the extent to which the received signals have the particular attributes of the theoretical signals;
        retrieving the plurality of theoretical covariance matrices from the store;
        calculating a covariance matrix for the received signals by performing a weighted sum of the retrieved plurality of theoretical covariance matrices using the determined respective plurality of weights; and
        computing beamformer coefficients based on the calculated covariance matrix for the received signals, said beamformer coefficients being for application by the beamformer to the received signals for generating a beamformer output.

21. The device of claim 20, the operations further comprising determining the plurality of theoretical covariance matrices.

22. The device of claim 20, wherein the signals are audio signals and the input comprises a plurality of microphones for receiving the audio signals.

23. The device of claim 20, further comprising a beamformer configured to apply the computed beamformer coefficients to the received signals, to thereby generate the beamformer output.

24. The device of claim 23, wherein the beamformer is a Minimum Variance Distortionless Response beamformer.

25. A computer program product for computing beamformer coefficients for signals received at an input of a device, the computer program product being embodied on a computer-readable memory device and configured so as when executed on a processor of the device to perform operations comprising:
    storing a plurality of theoretical covariance matrices for a respective plurality of theoretical signals in a store, each theoretical signal having its own particular attributes, the theoretical covariance matrices being for use in computing beamformer coefficients for application by a beamformer to the signals received at the device;
    determining, for the plurality of theoretical covariance matrices, a respective plurality of weights based on an analysis of the extent to which the received signals have the particular attributes of the theoretical signals;
    retrieving the plurality of theoretical covariance matrices from the store;
    calculating a covariance matrix for the received signals by performing a weighted sum of the retrieved plurality of theoretical covariance matrices using the determined respective plurality of weights; and
    computing the beamformer coefficients based on the calculated covariance matrix for the received signals, said beamformer coefficients being for application by a beamformer to the received signals for generating a beamformer output.

26. A device configured to compute beamformer coefficients, the device comprising:
    a store configured to store a plurality of theoretical covariance matrices for a respective plurality of theoretical signals, each theoretical signal having its own particular attributes, the covariance matrices being for use in computing beamformer coefficients for application by a beamformer to signals received at the device;
    a receiver configured to receive signals;
    a weight determining block configured to determine, for the plurality of theoretical covariance matrices, a respective plurality of weights based on an analysis of the extent to which the received signals have the particular attributes of the theoretical signals;
    a retrieving block configured to retrieve the plurality of theoretical covariance matrices from the store;
    a calculating block configured to calculate a covariance matrix for the received signals by performing a weighted sum of the retrieved plurality of theoretical covariance matrices using the determined respective plurality of weights; and
    a computing block configured to compute the beamformer coefficients based on the calculated covariance matrix for the received signals, said beamformer coefficients being for application by the beamformer to the received signals for generating a beamformer output.

27. The device of claim 20, wherein said particular attributes of a signal comprise a spectral shape of the signal.

28. The device of claim 27, wherein the spectral shape is that of white noise.

* * * * *